United States Patent [19]

Katsube

[11] Patent Number: 4,824,281

[45] Date of Patent: Apr. 25, 1989

[54] DEVICE FOR CONNECTING A WHEEL-LIKE BODY TO A SHAFT

[75] Inventor: Shinji Katsube, Shiga, Japan

[73] Assignee: Tsubakimoto Chain Co., Japan

[21] Appl. No.: 159,118

[22] Filed: Feb. 23, 1988

[30] Foreign Application Priority Data

Feb. 24, 1987 [JP] Japan .................................. 62-39278

[51] Int. Cl.$^4$ .............................................. F16B 2/14
[52] U.S. Cl. ...................... 403/369; 403/370
[58] Field of Search ........................ 403/369, 370, 371

[56] References Cited

U.S. PATENT DOCUMENTS 1,655,734  1/1928  McWilliams ..................... 403/370 X
1,687,777  10/1928  McMurtrie et al. ............ 403/370 X
4,615,640  10/1986  Hosokawa ............................. 403/369

Primary Examiner—Andrew V. Kundrat
Attorney, Agent, or Firm—Steele, Gould & Fried

[57] ABSTRACT

The connecting device for a wheel includes an outer ring having axial slits, an inner tapered surface, an inner threaded surface formed adjacent the maximum inside diameter end of the tapered surface, and an outer peripheral surface. A split inner ring having a tapered surface complementary to said tapered surface of the outer ring placed on the shaft and includes an annular groove formed at the maximum outside diameter end side of the inner ring tapered surface. A nut, having a threaded surface, is threadably engaged with the threaded surface of the outer ring. The nut includes annular projection fitting into the annular groove in the inner ring and has a seating surface perpendicular to the shaft.

2 Claims, 3 Drawing Sheets

DEVICE FOR CONNECTING A WHEEL-LIKE BODY TO A SHAFT

BACKGROUND OF THE INVENTION

This invention relates to a device for connecting a wheel-like body to a shaft, and more particularly to a device which can connect a wheel-like body to a shaft by tightening a nut, and the body is positively disconnected from the shaft when the nut is loosened, the body being capable of being secured to any desired position on the shaft.

A known device for connecting a wheel to a shaft is shown in FIG. 6. The device comprises an outer ring 70 having a tapered inner peripheral surface, an annular groove formed adjacent the end with a minimum inside diameter and an outer surface with a groove for accommodating a retaining ring; an inner ring 80 having a tapered surface complementary to the tapered surface of the outer ring, a threaded outer surface extending from the end with a minimum outside diameter of said tapered surface and a plurality of axial slits; a nut 90 having an annular projection fitting into the annular groove in the outer ring and a threaded surface in the inner ring; and a retaining ring 60 for holding said outer ring.

In this connecting device, tightening the nut 90 causes the outer ring 70 to move in the axial direction (as shown by arrow 91), and by means of the wedge action between the outer and the inner rings, a pressing force is generated between the shaft 40 and the wheel (boss) 50 in the radial direction, thereby fastening the shaft 40 and the wheel 50.

In this connecting device, the inner ring 80 will not move in the axial direction because of the friction with the shaft 40; the outer ring 70 is caused to move in the axial direction as shown by arrow 91 as result of the rotation of the nut 90.

Thus, the wheel 50 is moved in the axial direction along with the outer ring 70. The amount of such movement inevitably varies according to the tolerances of manufacture of each part; and accordingly, accurate axial positioning of the wheel 50 is not possible with this device.

OBJECTS OF THE INVENTION

It is an object of the present invention to provide a wheel connecting device which locks a wheel to a shaft without significant rotation of the wheel.

It is another object of the present invention to provide accurate axial positioning of the wheel without such positioning being affected by the wheel connecting device.

It is a further object of the present invention to provide a connecting device which exerts a higher connecting force and transmission torque.

SUMMARY

The connecting device for a wheel includes an outer ring having axial slits, an inner tapered surface, an inner threaded surface formed adjacent the maximum inside diameter end of the tapered surface, and an outer peripheral surface. A split inner ring having a tapered surface complementary to said tapered surface of the outer ring placed on the shaft and includes an annular groove formed at the maximum outside diameter end side of the inner ring tapered surface. A nut, having a threaded surface, is threadably engaged with the threaded surface of the outer ring. The nut includes annular projection fitting into the annular groove in the inner ring and has a seating surface perpendicular to the shaft.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

Figure 1:
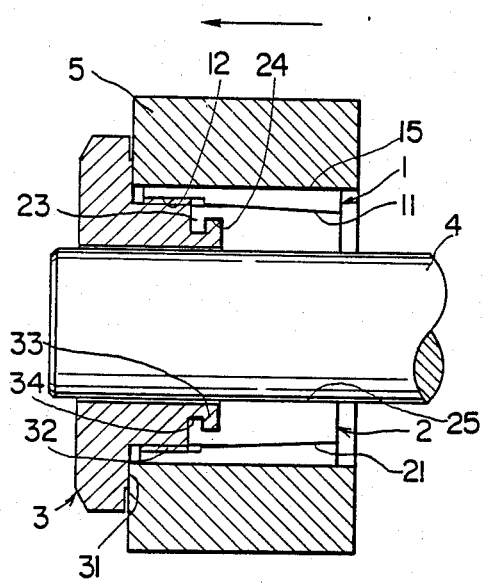
FIG. 1 is a longitudinal sectional view showing a first embodiment in which a shaft and a wheel are connected.
Figure 2:
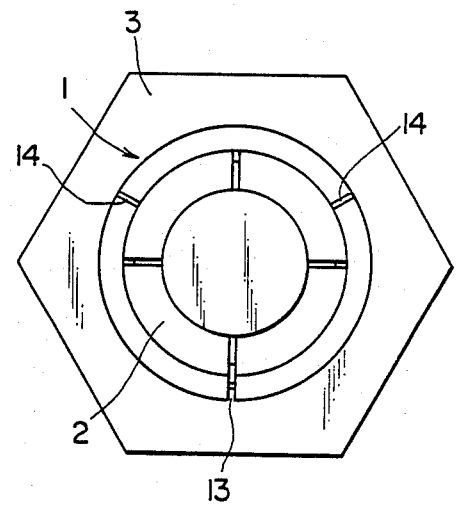
FIG. 2 is a right-hand side elevation of FIG. 1 with a shaft and a wheel removed.
Figure 3:
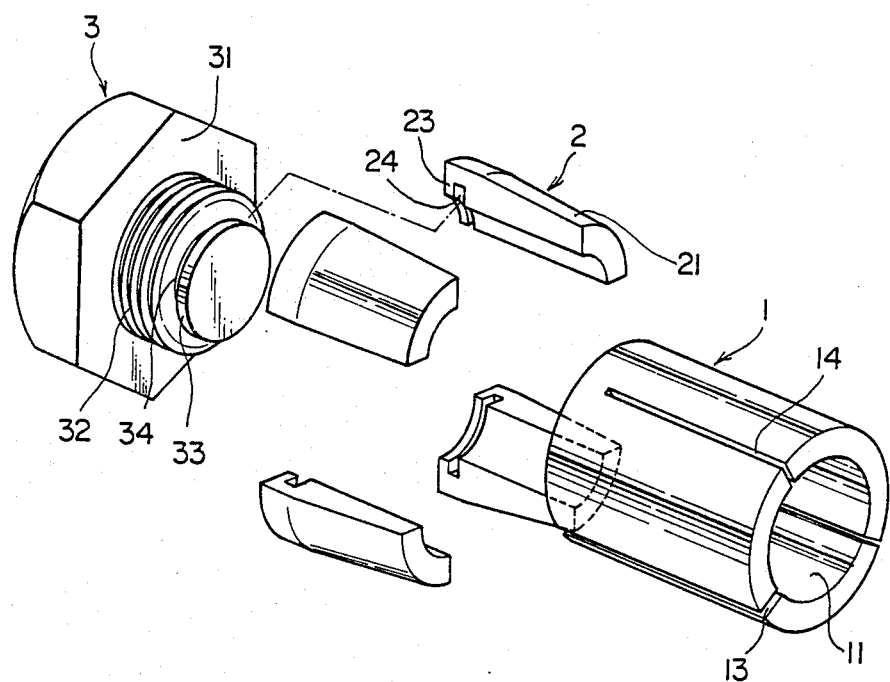
FIG. 3 is a broken-away view of the first embodiment.

The first embodiment of this invention is shown in FIGS. 1 to 3. These figures show an outer ring 1, the relationship of ring 1 to nut 3 as well as to an inner ring 2 which is held captive axially by the nut 3. Outer ring 1 has an inner tapered surface 11 and an inner threaded surface 12 formed adjacent the maximum inside diameter end of tapered surface 11. Outer ring 1 also includes an outer peripheral surface 15. An axially split inner ring 2 has a tapered surface complementary to outer ring tapered surface 11. The inner ring includes an annular groove 24 formed at the maximum outside diameter end side of the inner ring tapered surface. Nut 3 has a threaded surface complementary to threaded surface 12 of outer ring 1. The nut includes an annular projection 33 that fits into the annular groove 24 of inner ring 2. The nut also has a seating surface 31 that is perpendicular to the axis of the shaft. Outer ring 1 has axial slits 14.

In the present invention, the rotation of nut 3 causes the axial movement of the outer ring which will generate the radial fastening force by means of the wedge action of the two tapered surfaced.

If the nut is rotated with its seating surface contacting wheel 5, the inner ring will be fixed in the axial direction as result of the reduction of the clearances among the various parts.

Therefore, the nut, fitting into the inner ring, will be kept from being moved in the axial direction. Furthermore, the wheel will also be kept from being moved in the axial direction by the seating surface of the nut. Consequently, only the outer ring will move in the axial direction, thereby making it possible to position the wheel accurately on the shaft.

By the wedge action between the two tapered surfaces of inner and outer rings 1 and 2; however, there will be no slip between the inner ring 2 and the shaft 4. Thus, the wheel 5 will tend to move together with the outer ring 1; however, its axial movement is not possible as the seating surface 31 of the nut 3 is in abutment therewith prohibiting such axial movement. Therefore, the wheel 5 may be fastened to the shaft 4 with accurate positioning.

Figure 4:
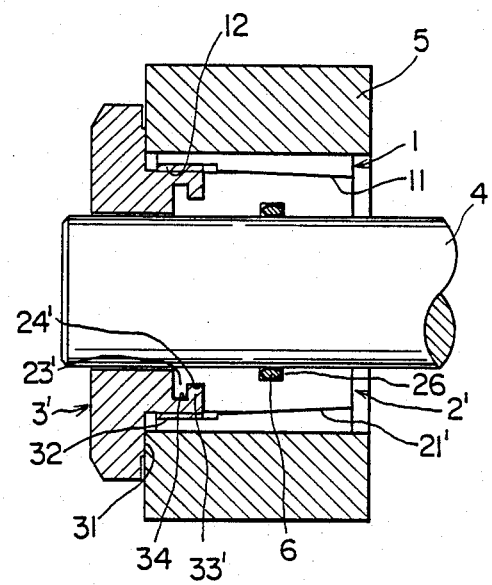
FIG. 4 is a longitudinal sectional view of a second embodiment in which a shaft and a wheel are connected.
Figure 5:
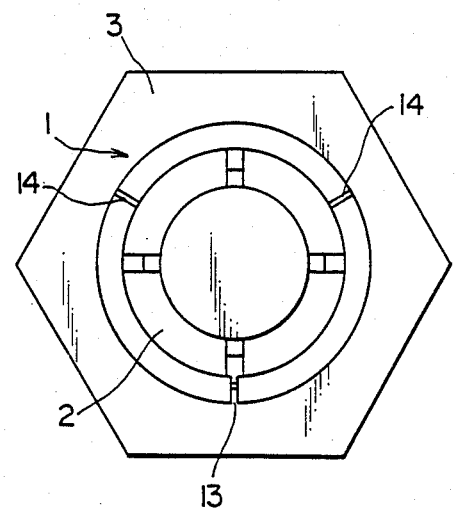
FIG. 5 is a right-hand side elevation of FIG. 4 with a shaft and a wheel removed.
Figure 6:
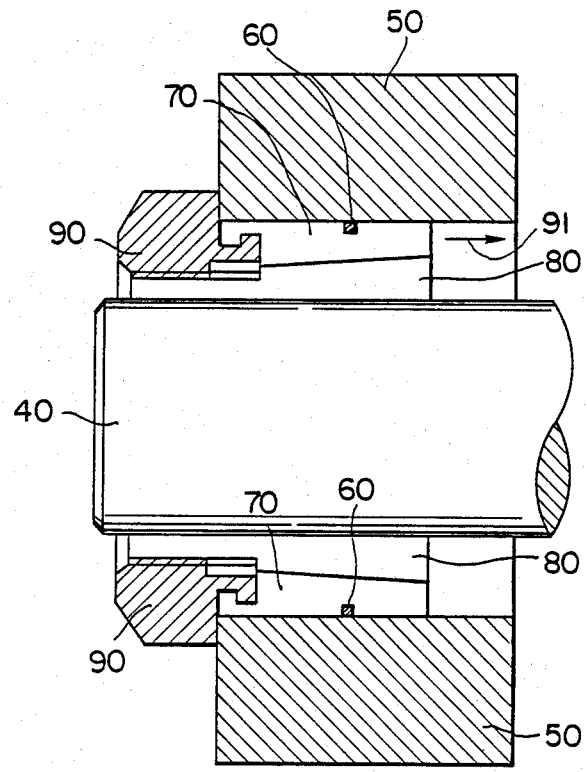
FIG. 6 is a longitudinal section of a prior art device in which a shaft and a wheel are connected.

FIGS. 4 and 5 show a second embodiment of this invention, in which the fitting relationship between the inner ring and the nut is reversed.

An inner ring 2' is formed with an annular groove 24' in an outer surface adjacent to the maximum outside diameter end of a tapered surface 21'. An annular projection 33' of a nut 3' fits into the groove 24'. The inner ring 2' has a circular groove 26 in its inner peripheral surface and a retaining ring (spring) fits into said groove.

In this embodiment, a retaining ring 6 is required, since the inner ring 2' cannot support itself radially inwardly, when the device stands alone. However, it will be appreciated that the groove 26 and the ring 6 are not absolutely necessary, because the inner ring 2' does not fall off, so long as a shaft is inserted.

The through slot 13 in outer ring 1 in both embodiments facilitates the expansion/contraction of the outer ring 1; however, it will also be appreciated that such a slot is not necessarily required for the present invention.

It is an advantage of the present invention that positioning of wheel 5 on shaft 4 is possible by contacting seating surface 31 of nut 3 with the wheel.

Namely, since inner ring 2 and nut 3 are held captive with each other, a shaft and a wheel may be connected and disconnected by the axial movement of the outer ring only as result of the rotation of the nut.

Moreover, as the outer ring is axially split (slots 14, 14'), its expansion/contraction is easy, thereby enabling transmission of larger torque; moreover, as the diameter of the threaded portion may be larger than before, the strength of the threaded portion may be increased, thus enabling higher connecting force and transmission torque.

What is claimed is:

1. A device for connecting a wheel-like body to a shaft comprising:
    an outer ring having axial slits, an inner tapered surface, an inner threaded surface formed adjacent to a maximum inside diameter end of said inner tapered surface, and an outer peripheral surface adapted to bear on said wheel-like body; a split inner ring engageable on said shaft and having an outer tapered surface complementary to said inner tapered surface of the outer ring, and an annular groove formed at a maximum outside diameter end side of said outer tapered surface; and a nut having a complementary threaded surface to the inner threaded surface of said outer ring, an annular projection fitting into said annular groove in the inner ring, and a seating surface perpendicular to the shaft.

2. A connecting device as claimed in claim 1 wherein said inner ring includes a groove on its inner peripheral surface and the device includes a resilient retaining ring disposed in said groove.

* * * * *